United States Patent [19]

Soshi et al.

[11] Patent Number: 5,328,391
[45] Date of Patent: Jul. 12, 1994

[54] CONTACT PIN SUBASSEMBLY

[75] Inventors: Isao Soshi; Tatsuhide Takebayashi, both of Tokyo, Japan

[73] Assignee: Asahi Kogaku Kogyo Kabushiki Kaisha, Tokyo, Japan

[21] Appl. No.: 26,074

[22] Filed: Mar. 4, 1993

Related U.S. Application Data

[63] Continuation of Ser. No. 755,453, Sep. 5, 1991, abandoned.

[30] Foreign Application Priority Data

Sep. 10, 1990 [JP]  Japan ................. 2-93972[U]

[51] Int. Cl.$^5$ .......................................... H01R 13/24
[52] U.S. Cl. ...................... 439/700; 439/824; 439/543; 439/928
[58] Field of Search ............... 439/700, 329-331, 439/80, 81, 839-841, 700, 824, 65, 66, 651-654, 543, 928; 354/286, 455, 257, 21

[56] References Cited

U.S. PATENT DOCUMENTS

| | | |
|---|---|---|
| Re. 32,049 | 12/1985 | Okura et al. . |
| 2,853,656 | 9/1958 | Dowds .................. 439/66 |
| 3,003,131 | 10/1961 | Nystuen ................. 439/329 |
| 3,757,219 | 9/1973 | Asku .................... 439/329 |
| 4,357,089 | 11/1982 | Okura et al. . |
| 4,420,239 | 12/1983 | Yasuyuki et al. . |
| 4,573,009 | 2/1986 | Fowler et al. ......... 439/374 |
| 4,582,374 | 4/1986 | Conrad et al. ......... 439/329 |
| 4,603,955 | 8/1986 | Haneishi . |
| 4,653,889 | 3/1987 | Haneishi . |
| 4,860,043 | 8/1989 | Kurei et al. . |
| 4,934,954 | 6/1990 | Fransson et al. ....... 439/289 |
| 4,939,532 | 7/1990 | Takebayashi . |
| 5,066,969 | 11/1991 | Kawasaki . |

*Primary Examiner*—David L. Pirlot
*Attorney, Agent, or Firm*—Sandler, Greenblum & Bernstein

[57] ABSTRACT

A contact pin subassembly including a plurality of contact pins, a contact pin holder which holds the contact pins and which is provided with a plurality of insulation ring portions in which the associated contact pins are slidably fitted, and springs which are held in the contact pin holder to bias the contact pins outward from the insulation ring portions. The contact pins subassembly may be combined into an assembly with a camera body, a lens, or some other subassembly of a device or instrument which requires contact pins, by mounting to the respective subassembly.

18 Claims, 4 Drawing Sheets

CONTACT PIN SUBASSEMBLY

This application is a continuation of application Ser. No. 07/755,453, filed Sep. 5, 1991, now abandoned.

BACKGROUND OF THE INVENTION

1. Field of the Invention

The present invention relates to a contact pin assembly provided for example in a camera body of a single lens reflex camera.

This application is related to the commonly assigned U.S. Pat. No. 4,860,043, the disclosure of which is expressly incorporated by reference herein.

2. Description of Related Art

In a recent single lens reflex camera, there are various functions, such as automatic aperture control, AF (Auto Focus), and PZ (Power Zoom), etc. In such a single lens reflex camera, electrical contact pin assemblies are provided on a camera body and an interchangeable lens. These contact pins of the contact pin assemblies come into contact with each other when the interchangeable lens is attached to the camera body. When in contact, a data communication between the camera body and the interchangeable lens can be carried out, and the interchangeable lens can receive power from the camera body.

It is necessary to bias the contact pins of the electrical contact pin assemblies, on either the camera body or the interchangeable lens, against the contact pins on the other assemblies so as to maintain the necessary pressure for the electrical charges to pass therebetween. Furthermore, the contact pins must be electrically insulated from the associated body mount member or lens mount member, which is made of electrically conductive metal.

To this end, in a known contact pin assembly, the contact pins are slidably fitted into separate insulation annular rings which are provided into the corresponding holes formed in the associated mount members. The contact pins of the camera body, for example, are biased by compression coil springs to project outwardly so as to electrically contact the contact pins of the interchangeable lens.

In the known contact pin assembly, each contact pin must be assembled with a separate insulation ring and a compression coil spring which must then be electrically connected to a predetermined connecting portion of a printed circuit board. This, however, is a complicated assembly.

SUMMARY OF THE INVENTION

The primary object of the present invention is to provide a contact pin subassembly which can eliminate the above mentioned drawback and can be easily assembled.

Another object of the present invention is to provide a contact pin subassembly which can be assembled independently of a device such as a camera body, to which the contact pin subassembly is to be attached.

To achieve the objects mentioned above, according to the present invention, there is provided a contact pin subassembly comprising a plurality of contact pins, a contact pin holder which holds the contact pins and which is provided with a plurality of insulation ring portions in which the associated contact pins are slidably fitted, and springs which are held in the contact pin holder to bias the contact pins in a direction outward from the insulation ring portions.

Preferably, the contact pin holder is provided with a circuit board, which is electrically connected to the contact pins through the springs.

The circuit board is preferably supported by the contact pin holder in a movable fashion.

The contact pin subassembly of the present invention can be used as a signal transmission mechanism or power supply mechanism between, for example, a camera body and an interchangeable lens of a single lens reflex camera.

The mount member or members of the camera body and/or the interchangeable lens is/are provided with a plurality of contact pin holes in which the insulation ring portions of the contact pin holder are fitted.

In order to movably or adjustably connect the circuit board to the contact pin holder, in one possible configuration, the contact pin holder is provided with a shaft portion projecting toward the circuit board and the circuit board is provided with an insertion hole which has a diameter larger than the diameter of the shaft portion, so that the shaft portion can be loosely fitted in the insertion hole.

Preferably, the axial length of the shaft portion is longer than the thickness of the circuit board, so that the circuit board is relatively movable in the axial direction of the contact pins.

The present disclosure relates to subject matter contained in Japanese Utility Model application No. 2-93972 (filed on Sep. 10, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 3:
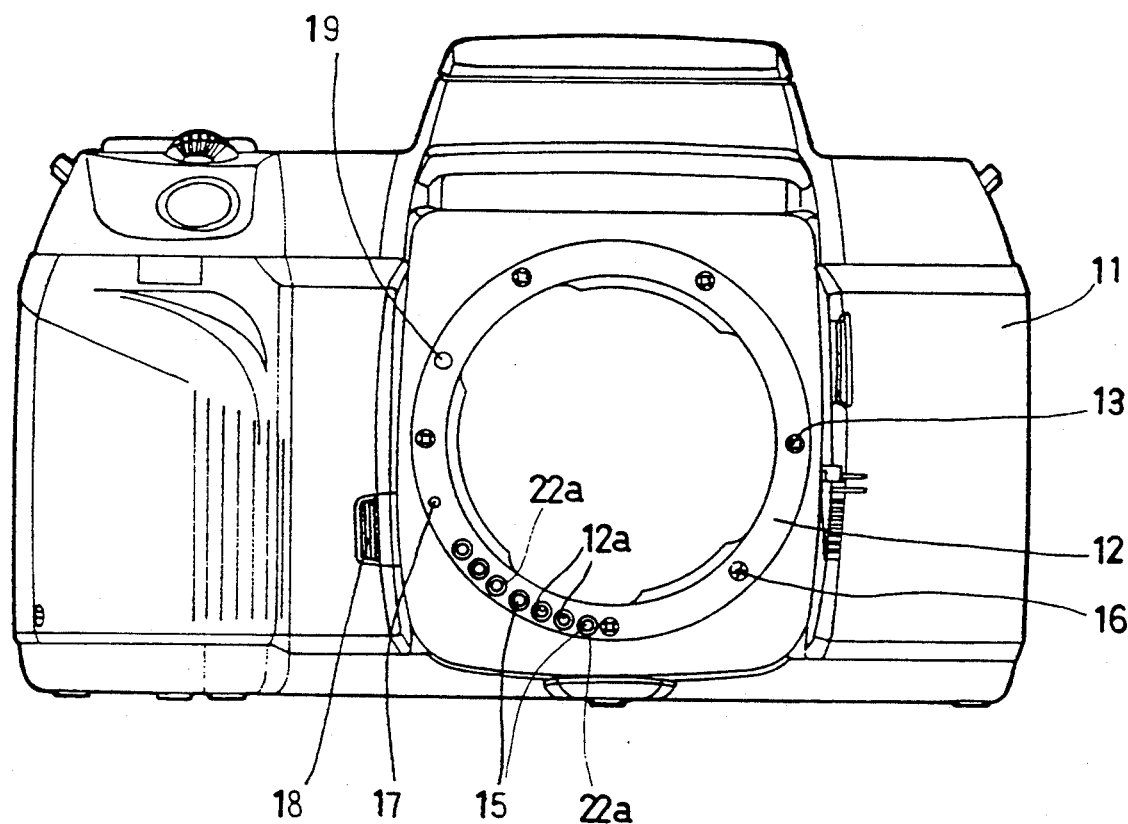
FIG. 3 is a front elevational view of a camera body and contact pin assembly according to the present invention; and, FIG. 4 is a perspective view of an interchangeable lens which is to be attached to a camera body.
Figure 4:
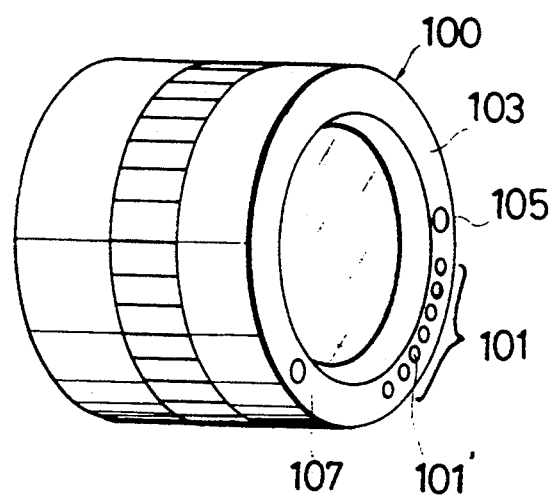

A contact pin subassembly of the illustrated embodiment is applied to a single lens reflex camera. As can be seen in FIG. 3, a camera body 11 has a metal body mount member 12 to which an interchangeable lens 100 (FIG. 4) is to be attached. The mount member 12 is secured to a front plate 14 (FIG. 1) within the camera body 11 by a plurality of set screws 13.

The mount member 12 is provided with a plurality of contact pins 15, to which the subject of the present invention is directed, an auto focusing (AF) coupler 16, a lock pin 17, a lock releasing lever 18, and a marker 19.

The AF coupler 16 rotates in accordance with the signals that are provided as output from an AF control device within the camera body 11, so that the rotation of the AF coupler 16 is transmitted to an AF coupler (pinion shaft) 107 provided on a lens mount member 103 of the interchangeable lens 100 (FIG. 4), when the interchangeable lens 100 is attached to the camera body 11. The rotation of the pinion shaft 107 is then converted to a movement of the focus adjusting lens group (not shown) in the optical axis direction, so as to carry out the AF operation.

The lock pin 17 is fitted in a lock hole 105, formed in the lens mount member 103 of the interchangeable lens 100, to lock the interchangeable lens to the camera body 11. The lock pin 17, which normally projects from the body mount member 12, is retracted from the mount member 12 to release the lock when the lock releasing lever 18 is depressed.

The marker 19 constitutes a positioning mark when the interchangeable lens 100 is attached to the camera body 11.

Figure 1:
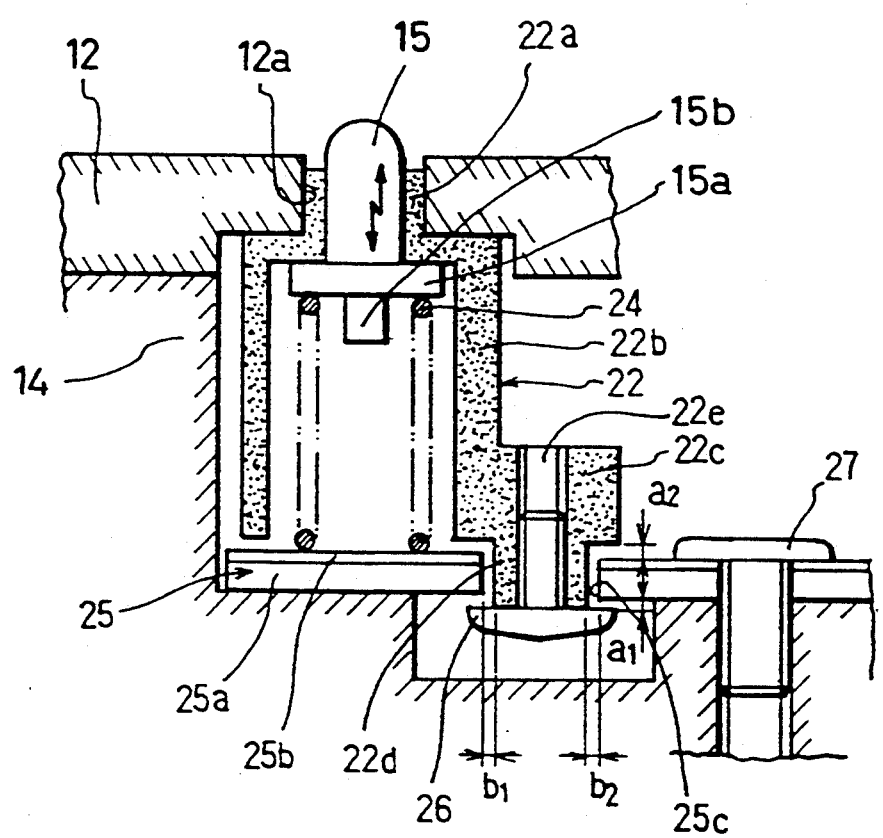
FIG. 1 is a sectional view of a contact pin subassembly according to the present invention.
Figure 2:
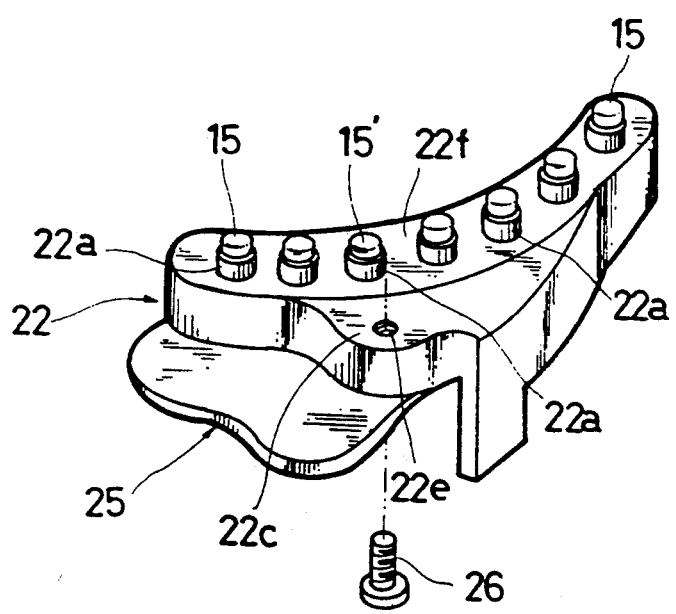
FIG. 2 is a perspective view of a contact pin holder of a contact pin subassembly shown in an assembled state.

The contact pins 15, of the present invention, are brought into contact with corresponding contact pins 101 of the interchangeable lens 100 when the latter is attached to the camera body 11. The contact pin subassembly including the contact pins 15 are constructed as shown in FIGS. 1 and 2.

In the present invention, the contact pins 15 are all received and held in a contact pin holder 22 which is made of electrical insulation material, such as hard synthetic resin or the like. The contact pin holder 22 is provided with an arched portion 22f having a radius of curvature identical to that of the body mount member 12, and a flange portion 22c which projects outwardly from the arched portion 22f. The projecting insulation ring portions 22a, corresponding to the contact pins 15, are provided on the arched portion 22f. The diameter, position and pitch (distance) of the insulation ring portions 22a correspond to those of corresponding contact pin holes 12a formed in the body mount member 12. A cylindrical spring receiving portion 22b is coaxially formed at the root of each insulation ring portion 22a to be integral therewith, to receive a compression coil spring 24.

The contact pins 15 are inserted in the corresponding insulation ring portions 22a of the contact pin holder 22 from the side of the spring receiving portions 22b. Each contact pin 15 has a flange 15a which prevents the contact pin from coming out of the insulation ring portion 22a, and a spring supporting shaft 15b which supports one end of the coil spring 24. The height (length) of the contact pin 15' shown in FIG. 2, is lower than that of the other contact pins 15'. The height of the contact pin 101' of the interchangeable lens 100 is higher than that of the remaining contact pins 101 to come into contact with the contact pin 15'. This is so that the contact pins 101, other than the contact pin 101', will not come into contact with the contact pin 15' corresponding to the contact pin 101' when the interchangeable lens is attached to the camera body 100.

The lower surface of contact pin holder 22 is provided with an electric circuit board 25 having a mother plate 25a and a flexible pattern 25b formed thereon. The circuit board 25 is connected to the contact pin holder 22 by a set screw 26 in a movable fashion. Namely, the flange portion 22c of the contact pin holder 22 has thereon, a shaft portion 22d projecting toward the circuit board 25. The circuit board 25 has therein, an insertion hole 25c having a diameter larger than that of the shaft portion 22d.

The axial length of the shaft portion 22d is larger than the thickness of the circuit board 25. The set screw 26 is screwed in a center threaded hole 22e formed in the shaft portion 22d. The head of the set screw 26 has a diameter larger than the diameter of the insertion hole 25c. When the shaft portion 22d of the contact pin holder 22 is inserted in the insertion hole 25c of the circuit board 25, and the set screw 26 is screwed in the threaded hole 22e, the circuit board 25 is held by the contact pin holder 22 so as to move horizontally in the plane perpendicular to the axes of the contact pins 15. The horizontal movement of the circuit board 25 is limited to the difference in diameter between the insertion hole 25c and the shaft portion 22d [(b1+b2) in FIG. 1]. The circuit board 25 is also movable in the vertical direction, i.e., the axial direction of the contact pins 15 relative to the contact pin holder 22, within a limit defined by the difference [(a1+a2) in FIG. 1] between the axial length of the shaft portion 22d and the thickness of the circuit board 25.

The contact pin subassembly as constructed above operates as follows.

After the contact pins 15 and 15' are inserted in the corresponding insulation ring portions 22a of the contact pin holder 22, the compression coil springs 24 are inserted in the associated spring receiving portions 22b and the shaft portions 22d are inserted in the corresponding insertion holes 25c of the circuit board 25. Thereafter, the set screw 26 is screwed in the threaded hole 22e, so that the contact pins 15, the compression coil springs 24 and the circuit board 25 are assembled together on the contact pin holder 22. Thus, a subassembly (block) of the contact pin assembly can be obtained.

In the sub-assembly, the contact pins 15 and 15' are biased by the compression coil springs 24 to project outwardly from the insulation ring portions 22a and are electrically connected to predetermined conductive terminals (not shown) on the circuit board 25 through the compression coil springs 24. It should be appreciated that the sub-assembly can be obtained independently of the assembling process of the camera body.

The circuit board 25 of the contact pin holder 22 in the sub-assembly is secured to the front plate 14 of the camera body by a set bolt 27 in the course of assembly of the camera body. The insulation ring portions 22a of the contact pin holder 22 are inserted in the associated contact pin holes 12a of the body mount member 12. Then the mount member 12 is secured to the front plate 14 of the camera body by the set screws 13.

Since the contact pin holder 22 may move relative to the circuit board 25 in horizontal and vertical directions within the predetermined limits (a1+a2, b1+b2) defined by the clearance between the shaft portion 22d and the insertion hole 25c, as mentioned above, even if the circuit board 25 is immovably secured, in advance, to the front plate 14, it is possible to fit the insulation ring portions 22a into the associated contact pin holes 12a, thus resulting in an improved assembly.

The conductive terminals of the circuit board 25 are shaped and placed so that even if a relative displacement between the shaft portion 22d and the insertion hole 25c takes place, due to the clearance therebetween, the electrical connection will remain between the compression coil springs 24 and the conductive terminals.

Although the above-mentioned embodiment is directed to a contact pin assembly on the camera body side, the present invention can be similarly applied to a contact pin subassembly on the interchangeable lens side. Furthermore, the present invention can be applied to a contact pin subassembly for a device or instrument other than a camera.

We claim:
1. A contact pin subassembly comprising:
a plurality of contact pins;

a self contained, insulative contact pin holder which holds said contact pins and which is provided with a plurality of insulation ring portions within which the associated contact pins are slidably fitted;

springs which are held in said contact pin holder to bias said contact pins outwardly from said insulation ring portions; and, an electrical circuit board provided on the contact pin holder to electrically connect the contact pins through the springs;

wherein said subassembly is capable of being independently assembled, the springs are inserted between the contact pins held by the contact pin holder, and the circuit board to bias the contact pins against the circuit board, the contact pin holder includes a shaft portion projecting toward the circuit board and the circuit board has an insertion hold which has a diameter larger than the shaft portion, so that the shaft portion can be loosely fitted in the insertion hole, and the shaft portion is provided with a threaded hole in which a set screw is screwed through the insertion hole.

2. A contact pin subassembly according to claim 1, wherein the electrical circuit board is movably connected to the contact pin holder.

3. A contact pin subassembly according to claim 1, wherein the set screw has a head with a diameter larger than that of the insertion hole.

4. A contact pin subassembly according to claim 1, wherein the shaft portion has an axial length longer than the thickness of the circuit board.

5. A contact pin and camera assembly comprising said contact pin subassembly according to claim 1;
a camera body; and
an interchangeable lens to be attached to said camera body;
wherein said contact pins are adapted to carry out data communication and/or power supply between said camera body and said interchangeable lens to be attached to said camera body.

6. A contact pin and camera assembly according to claim 5, wherein said camera body and said interchangeable lens are provided with mount members which are connected to each other when said interchangeable lens is attached to said camera body.

7. A contact pin and camera assembly according to claim 6, wherein said mount member of said camera body or said mount member of said interchangeable lens is provided with a plurality of contact pin holes in which said insulation ring portions of said contact pin holder are fitted.

8. A contact pin subassembly according to claim 1, wherein the springs are compression coil springs.

9. A contact pin subassembly according to claim 8, wherein the contact pin holder has cylindrical spring receiving portions for receiving the associated compression coil springs.

10. A contact pin subassembly comprising:
a plurality of contact pins;
a self-contained, insulative contact pin holder which holds said contact pins and which is provided with a plurality of insulation ring portions within which the associated contact pins are slidably fitted; and,
a circuit board electrically connected to said contact pins and movably supported by said contact pin holder;
wherein said subassembly is capable of being independently assembled, said contact pin holder includes a shaft portion projecting toward the circuit board and said circuit board has an insertion hole which has a diameter larger than the shaft portion, so that the shaft portion can be loosely fitted in the insertion hole, and said shaft portion is provided with a threaded hole in which a set screw is screwed through the insertion hole.

11. A contact pin subassembly according to claim 10, wherein the set screw has a head with a diameter larger than that of the insertion hole.

12. A contact pin subassembly according to claim 11, wherein said shaft portion has an axial length longer than the thickness of the circuit board.

13. A contact pin subassembly comprising:
a plurality of contact pins;
a self contained, insulative contact pin holder which holds said contact pins and which is provided with a plurality of insulation ring portions within which the associated contact pins are slidably fitted;
springs which are held in said contact pin holder to bias said contact pins outwardly from said insulation ring portions;
an electrical circuit board provided on said contact pin holder and electrically connected to said contact pins through said springs; and
means for connecting said electrical circuit board with said contact pin holder so that said electrical circuit board remains movable with respect to said contact pin holder,
wherein each of said plurality of contact pins comprises a longitudinal axis, said longitudinal axes being substantially parallel to one another, wherein said contact pin holder while enabling said electrical circuit board to move in a direction substantially perpendicular to said longitudinal axes.

14. A contact pin subassembly according to claim 13, wherein said movement in a direction substantially perpendicular to said longitudinal axes is limited to a predetermined area.

15. A contact pin subassembly according to claim 13, wherein each of said plurality of contact pins comprises a longitudinal axis, said longitudinal axes being substantially parallel to one another, wherein said means for connecting connects said electrical circuit board to said contact pin holder while enabling said electrical circuit board to move in a direction substantially parallel to said longitudinal axes.

16. A contact pin subassembly according to claim 15, wherein said movement in a direction substantially parallel to said longitudinal axes is limited to a predetermined distance.

17. A contact pin subassembly comprising:
a plurality of contact pins;
a self contained, insulative contact pin holder which holds said contact pins and which is provided with a plurality of insulation ring portions within which the associated contact pins are slidably fitted;
springs which are held in said contact pin holder to bias said contact pins outwardly from said insulation ring portions;
an electrical circuit board provided on said contact pin holder and electrically connected to said contact pins through said springs; and
means for connecting said electrical circuit board with said contact pin holder so that said electrical circuit board remains movable with respect to said contact pin holder, wherein said means for connecting comprises a male connector and a female connector, said male connector being part of one of said electrical circuit board and said contact pin holder, and said female connector being part of the other of said electrical circuit board and said contact pin holder, wherein said male and female connectors are dimensioned so as to enable limited predetermined movement, upon connection, along two perpendicular axes.

18. A contact pin subassembly according to claim 17, wherein said male connector is substantially aligned along an axis, and said limited predetermined movement is enabled in directions substantially perpendicular to said axis and substantially parallel to said axis.

* * * * *

UNITED STATES PATENT AND TRADEMARK OFFICE
CERTIFICATE OF CORRECTION

PATENT NO. : 5,328,391
DATED : July 12, 1994
INVENTOR(S) : Isao SOSHI et al.

It is certified that error appears in the above-indentified patent and that said Letters Patent is hereby corrected as shown below:

At column 6, line 32 (claim 13, line 19), insert ---said means for connecting connects said electrical circuit board to--- after "wherein".

Signed and Sealed this

Seventh Day of March, 1995

Attest:

BRUCE LEHMAN

Attesting Officer      Commissioner of Patents and Trademarks